3,284,944
FISHING LURE
Clayton C. Settle, Columbus, Ind.
(2250 Leonard Springs Road, Bloomington, Ind. 47401)
Filed Aug. 7, 1964, Ser. No. 388,125
4 Claims. (Cl. 43—42.15)

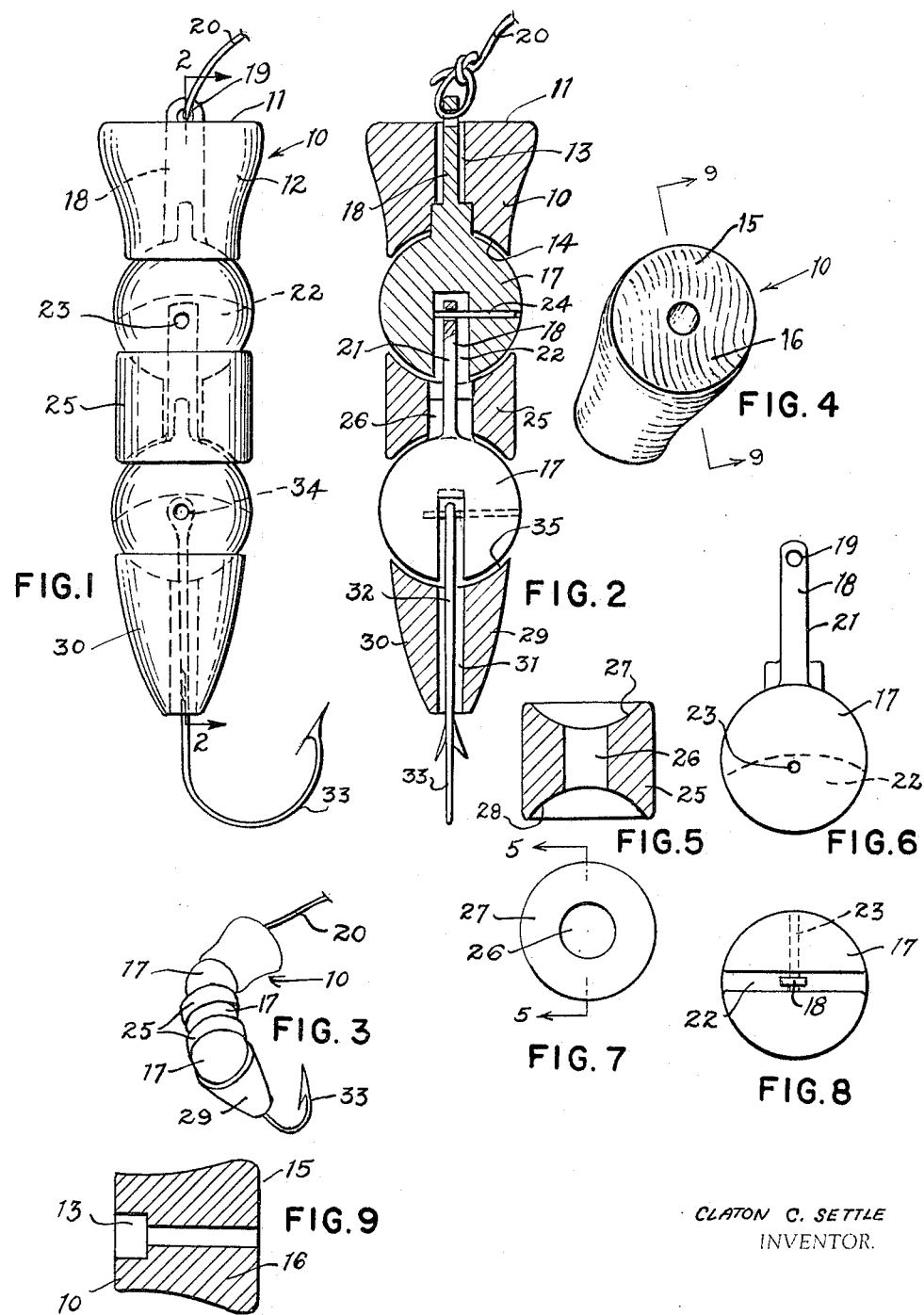

This invention relates generally to the field of artificial fishing lures, and more specifically to a novel lure design which more accurately simulates the natural motions of such popular bait as willow worms and catalpa worms.

Many fishing lures have been developed with the intention of providing a wiggling action upon being drawn through the water. Such action involves the tail of the lure moving from one side of the head to the other in a manner similar to that made by a night crawler or similar grub. My invention is directed to the provision of a segmented lure which is designed to make successive arcuate movements in one direction and so provide a movement which has thus far not been achieved in artificial lures. Further novelty lies in the means of connecting the several adjoining segments of the lure which combines to form a relatively continuous contour which performs effectively in all water temperatures.

It is therefore a primary object of this invention to provide a novel fishing lure comprising a number of jointed segments which perform effectively in simulating the action of willow worms and catalpa worms and other bait of this class.

It is a further object of this invention to provide a novel fishing lure which comprises a number of pivotally connected segments having alternate contrasting colors such that no additional finishing is necessary.

It is yet a further object of this invention to provide a novel fishing lure which may be constructed and assembled in an efficient and economical manner so as to enable retail at low cost.

A full understanding of the details of the invention, together with further advantages, will become apparent by reference to the following detailed description of a preferred embodiment thereof, taken in conjunction with the attached drawings wherein:

FIG. 1 is a plan view of the assembled fishing lure constructed according to my invention.

FIG. 2 is a cross sectional side elevation taken along the lines 2—2 of FIG. 1.

FIG. 3 is a perspective view of a modified lure shown in the curved or flexed position.

FIG. 4 is a perspective view of the head segment showing the combination of convex and concave surfaces on the lead portion thereof.

FIG. 5 is a cross section of a cylindrical segment used in the construction of the lure, and taken along the lines 5—5 of FIG. 7.

FIG. 6 is a side elevation of a ball segment used in the construction of the lure.

FIG. 7 is a plan view of the cylindrical segment shown in FIG. 5.

FIG. 8 is a plan view of the ball segment shown in FIG. 6.

FIG. 9 is a cross sectional side elevation taken along the lines 9—9 of FIG. 4.

Similar reference characters indicate corresponding parts throughout the several views in the drawings.

Referring now to the drawings in detail, the numeral 10 represents the head of the lure. The head portion is an important part of this invention since it is the contour of the front face 11 which causes the arcuate flexing of the adjoining segments in one direction. The head has a cylindrical outer surface 12 which tapers downwardly in an arcuate manner from the front face 11 to form a symmetrical conical configuration. The head has a central bore 13 which communicates with a spherical concave bearing surface 14 to form the rear end of the head. The front face 11 has an undulating contour consisting of a convex portion 15 on one side of the bore 13, this portion continuing into a concave portion 16 formed on the other side of the bore.

A spherical segment 17 is provided with an elongated tongue 18 which is adapted to be inserted through the bore 13 of the head 10 so as to protrude therethrough and form a small eyelet 19 to which a leader 20 is secured. The tongue 18 is flat and has arcuate side edges 21 which embrace the bore 13 and thereby permit rotation of the spherical segment about the axis of the bore 13. An arcuate slot 22 is formed through the segment 17 in the same plane as the tongue 18 and to sufficient depth to extend beyond the centre of the segment. A transverse pin hole 23 extends through the side of the spherical segment to receive a pin 24 which pivotally retains an eyelet 19 of a successive spherical segment of similar configuration.

Intermediate the two linked spherical segments 17 is a cylindrical segment 25 which has a concentric bore 26 formed therethrough, and is further formed with concave upper and lower bearing surfaces 27 and 28 which engage with successive spherical segments such as 17. It will be clear from this description that the spherical segments are free to pivot in a single plane relative to each other with the cylindrical segment 25 providing a substantially continuous cylindrical outer form to the lure. Any desired number of spherical and cylindrical segments may be connected together in this manner, as shown in FIGURE 3, to make a lure of the desired length.

The tail 29 has a conical outer surface 30 which converges towards the lower end of the lure. The tail has a central bore 31 through which passes the shank of a fish hook 33. The eyelet 34 of the fish hook is secured within the slot 22 of the last segment 17 by a pin 24 in like manner to the connection of successive spherical segments. The top surface 35 of the tail is concave in shape so as to receive the lower portion of the last spherical segments 17.

In operation as the fishing line is tugged, water is directed over the convex portion 15 of the head so as to impinge on the concave portion 16 and thereby cause this portion to be depressed out of alignment with the leader 20. This action causes the several successive elements of the lure to bow into an arcuate shape which shape is maintained until the jolt or tug on the line subsides, at which time the lure will straighten itself preparatory to a successive jolt whereupon the flexing is repeated. The slight clearance afforded between the several segments and the pivotal connection of one segment to the centre of a successive like segment permits a smooth sliding movement between these parts and results in a realistic likeness to a live grub. A multi-barbed hook may of course be substituted for the single hook if so desired.

Having described the invention in considerable particularity, it should be understood that various modifications may be made to the precise detail thereof, without departing from the scope or spirit of the invention as defined in the appended claims.

I claim:

1. A fishing lure, comprising, a head, a spherical segment, a tongue protruding from the spherical segment through a concentric bore formed in the head, a cylindrical segment having concave ends to embrace one end of said spherical segment and one end of a successive similar spherical segment, a tongue protruding from said successive spherical segment through a bore formed through the cylindrical segment into a slot formed in said first spherical segment, eyelets formed on the end of the tongues, pins passing through the spherical segments transversely through the slots to engage through and retain the eyelets, and a tail having a bore therethrough to receive the shank of a fish hook, said shank having an eyelet pinned within the slot formed in said successive spherical segment.

2. A fishing lure according to claim 1, wherein said head is formed with an undulated front face having a convex form on one side of the bore and a concave form on the other side of the bore.

3. A fishing lure according to claim 1, wherein several spherical and cylindrical segments are alternately connected together to provide a lure of any desired length.

4. A fishing lure, comprising, a head, a concentric bore formed through the head, said head having a front face of undulated contour, spherical segments, tongues protruding from said segments and terminating with eyelets, said segments having slots formed therein in the plane of said tongues, cylindrical segments having concave ends disposed between the spherical segments, each tongue projecting through an adjacent cylindrical segment into the slot of a successive spherical segment, pins pivotally mounting the eyelets within the slots, a tail having a bore receiving the shank of a hook therethrough said shank terminating with an eyelet pinned within the slot of the last of said successive spherical segments, and the tongue of the first of said successive spherical segments extending through the bore formed in said head.

References Cited by the Examiner

UNITED STATES PATENTS

| | | | |
|---|---|---|---|
| 2,617,226 | 11/1952 | Yoshii | 43—42.15 X |
| 2,674,060 | 4/1954 | Simmons | 43—42.15 |

FOREIGN PATENTS

| | | |
|---|---|---|
| 482,582 | 4/1952 | Canada. |
| 73,399 | 4/1948 | Norway. |

ABRAHAM G. STONE, *Primary Examiner.*

SAMUEL KOREN, *Examiner.*

R. L. HOLLISTER, *Assistant Examiner.*